United States Patent
Kwon et al.

(10) Patent No.: US 9,537,162 B2
(45) Date of Patent: Jan. 3, 2017

(54) DEVICE AND METHOD FOR CONTROLLING COLD START OF FUEL CELL SYSTEM

(71) Applicant: Hyundai Motor Company, Seoul (KR)

(72) Inventors: Soon Woo Kwon, Gyeonggi-do (KR); Joon Yong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/569,746

(22) Filed: Dec. 14, 2014

(65) Prior Publication Data

US 2016/0093906 A1 Mar. 31, 2016

(30) Foreign Application Priority Data

Sep. 25, 2014 (KR) ........................ 10-2014-0128019

(51) Int. Cl.
*H01M 8/06* (2016.01)
*H01M 8/04* (2016.01)

(52) U.S. Cl.
CPC ....... *H01M 8/04302* (2016.02); *H01M 8/0491* (2013.01); *H01M 8/04225* (2016.02); *H01M 2250/20* (2013.01)

(58) Field of Classification Search
CPC .............. H01M 8/04225; H01M 8/04302; H01M 8/04589; H01M 8/04619; H01M 8/0491
See application file for complete search history.

(56) References Cited

U.S. PATENT DOCUMENTS

| 7,883,809 B2 | 2/2011 | Hochgraf | |
| 2001/0008192 A1* | 7/2001 | Morisawa | B60K 6/46 180/197 |
| 2012/0183814 A1 | 7/2012 | Boegershausen et al. | |

FOREIGN PATENT DOCUMENTS

| JP | 08-033119 A | 2/1996 |
| JP | 2004-247164 A | 9/2004 |
| JP | 2006-100094 A | 4/2006 |
| JP | 2007-188826 A | 7/2007 |
| JP | 2012-153253 A | 8/2012 |
| JP | 2012-212683 A | 11/2012 |
| KR | 10-2011-0006527 A | 1/2011 |
| KR | 10-2011-0059030 A | 6/2011 |
| KR | 10-2013-0003585 A | 1/2013 |
| KR | 10-2015-0078448 A | 7/2015 |
| WO | WO-2008-127354 A2 | 10/2008 |

* cited by examiner

*Primary Examiner* — Patrick Ryan
*Assistant Examiner* — Ben Lewis
(74) *Attorney, Agent, or Firm* — Mintz Levin Cohn Ferris Glovsky and Popeo, P.C.; Peter F. Corless

(57) ABSTRACT

A device and a method for controlling a cold start of a fuel cell system are provided and are capable of increasing a fuel cell load to reduce a cold start time using a kinetic energy storage method for a rotor of a motor for driving a fuel cell system. The method improves cold start performance by performing self-heating of a fuel cell stack based on an increase in an output current amount of a fuel cell and by restricting a motor torque simultaneously with generating the motor torque while applying a current to a motor when a vehicle stops to consume an output current of the fuel cell.

7 Claims, 6 Drawing Sheets

- RELATED ART -

- THE PRESENT -

DEVICE AND METHOD FOR CONTROLLING COLD START OF FUEL CELL SYSTEM

CROSS-REFERENCE TO RELATED APPLICATION

This application claims under 35 U.S.C. §119(a) the benefit of Korean Patent Application No. 10-2014-0128019 filed on Sep. 25, 2014, the entire contents of which are incorporated herein by reference.

BACKGROUND (a) Technical Field

The present disclosure relates to a device and a method for controlling a cold start of a fuel cell system. More particularly, the present invention relates to a device and a method for controlling a cold start of a fuel cell system capable of increasing a fuel cell load for reducing a cold start time using a kinetic energy storage method for a rotor of a motor for driving a fuel cell system.

(b) Background Art

In a hydrogen fuel cell system, cold start performance during the winter season (e.g., during substantially cold weather) may be difficult. Methods in the related art have been developed for rapidly thawing pure water within a stack using a heater, for using an anti-freezing liquid for a fuel cell stack as cooling water, and the like.

Despite the methods developed for securing cold start performance, when the fuel cell system is left in substantially low-temperature environment such as below zero temperatures, a temperature of the fuel cell stack equipped in the fuel cell system decreases below zero degrees, thus causing the fuel cell stack to potentially be frozen. To rapidly increase the temperature of the stack during the cold start of the fuel cell system, it is efficient that the fuel cell stack outputs a substantial current to use heat generated by a unique chemical reaction of the stack. Accordingly, a method has been developed for outputting an output current of the stack by maximally using various loads equipped within a vehicle during the cold start, and a motor has been used as a heating element to increase a current load of a stack.

In other words, a technology of contributing to the increase of the temperature of the stack by transferring heat from a motor and an inverter to the stack by using phase resistance heating of a driving motor as a current load of the stack but performing a control to interrupt a generation of a motor torque so as not to prevent the motor from being driven has been developed. Accordingly, various technologies for enhancing the cold start of the fuel cell system have been proposed, but a more effective method has been continuously required.

The above information disclosed in this section is merely for enhancement of understanding of the background of the invention and therefore it may contain information that does not form the prior art that is already known in this country to a person of ordinary skill in the art.

SUMMARY

The present invention provides a device and a method for controlling a cold start of a fuel cell system that may improve cold start performance by performing self-heating of a fuel cell stack based on an increase in an output current amount of a fuel cell, by restricting a motor torque simultaneously with generating the motor torque while applying a current to a motor when a vehicle stops to consume an output current of the fuel cell.

In one aspect, the present invention provides a device for controlling a cold start of a fuel cell system that may include: a fuel cell configured to apply a current to a motor during a cold start condition of the fuel cell system; and a torque restriction part configured to restrict a torque generated when a rotor of the motor rotates forward and reversely based on an application of current, whereby output current consumption of the fuel cell may be increased due to power consumed in the motor during the cold start condition. In addition, the torque restriction part may be adopted as a park (P) stage latch of a reduction gear restrictively fastened with an output shaft that extends from the rotor of the motor to a driving wheel. The torque restriction part may be a hydraulic brake apparatus of a driving wheel.

In another aspect, the present invention provides a method for controlling a cold start of a fuel cell system that may include: applying an output current of a fuel cell to a motor during a cold start condition of the fuel cell system; increasing output current consumption of the fuel cell by angularly rotating a rotor of the motor forward and reversely within a predetermined angle range based on an application of current; and restricting a torque generated when the rotor of the motor angularly rotates.

Further, in the increasing of the output current consumption of the fuel cell, during motoring of the motor, power consumption, which is a value obtained by multiplying a forward (+) rotation speed of the rotor by a positive (+) torque generated when the rotor rotates forward (+) may be generated, and power consumption, which is a value obtained by multiplying a reverse (−) rotation speed of the rotor by a negative (−) torque generated when the rotor rotates in a reverse (−) direction may be generated. In addition, in the restricting of the torque, a driver may perform shifting to a P stage to thus restrictively fasten a P stage latch of a reduction gear with an output shaft from the rotor to a driving wheel. In the restricting of the torque, a driver may operate a hydraulic brake apparatus of a driving wheel to restrict the driving wheel connected to the rotor via an output shaft.

By the above configuration, the present invention has the following effects.

First, it may be possible to increase the output current amount of the fuel cell based on the consumption of kinetic energy of the rotor by causing the rotor to be the fuel cell load and reduce the cold start time by performing the self-heating of the fuel cell stack based on the output current amount of the fuel cell, by applying a current to the motor for driving the fuel cell system during the cold start condition to generate the angle rotation and the torque of the rotor.

Second, it may be possible to prevent the motor from motoring for the actual driving prior to the ending of the cold start by restricting the rotor torque of the motor by the torque restriction apparatus (e.g., P stage latch of the reduction gear and the hydraulic brake apparatus of the driving wheel).

Third, since the rotor of the motor may be rotated forward and reversely at a predetermined angle to generate a torque, the IGBT for the forward and reverse control of the rotor among the plurality of IGBTs of the inverter which is a type of controller configured to a current to the motor may be uniformly used, and as a result, it may be possible to prevent the degradation in durability due to the intensive use of some of the IGBTs of the inverter.

Fourth, it may be possible to more easily delaminate the interface between the respective parts bonded by cooling, by vibrating the cooled parts of the fuel cell stack and the peripheral system based on the vibration generated by the rotation of the rotor of the motor and the generation of the torque.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
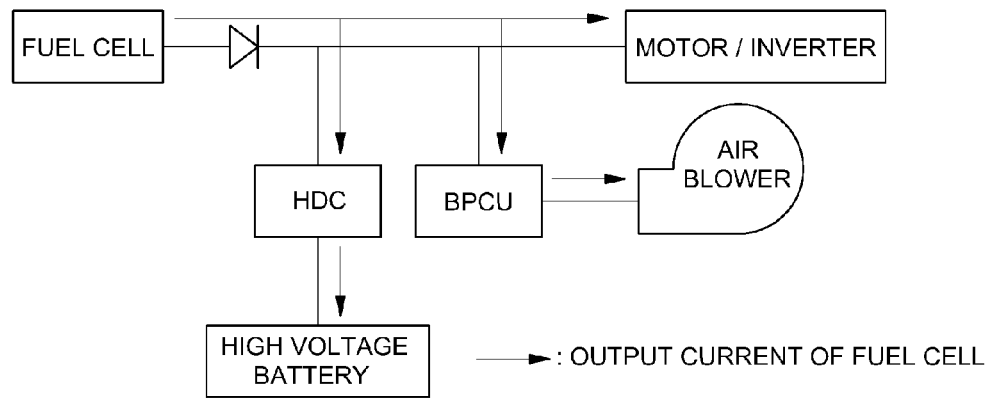
FIG. 1 is an exemplary schematic diagram illustrating a strategy of a cold start by inducing the increase of temperature of a fuel cell using self-heating of a fuel cell stack according to an exemplary embodiment of the present invention.

Reference numerals set forth in the Drawings includes reference to the following elements as further discussed below:

10: motor
12: inverter
20: torque restriction part
22: P stage latch of reduction gear
30: fuel cell It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Referring to FIG. 1, an output current of a fuel cell may be consumed from various loads (e.g., HDC and BPCU which are a controller, high voltage battery, air blower, motor and inverter, and the like) during a cold start condition and thus self-heating of a stack may be induced. Therefore, in the exemplary embodiment of the present invention the fuel cell system may use a substantial amount of output current of the fuel cell during the cold start condition to induce the self-heating of the fuel cell stack and reduce the cold start time based on an increase in temperature of the fuel cell due to the self-heating thereof.

Figure 2:
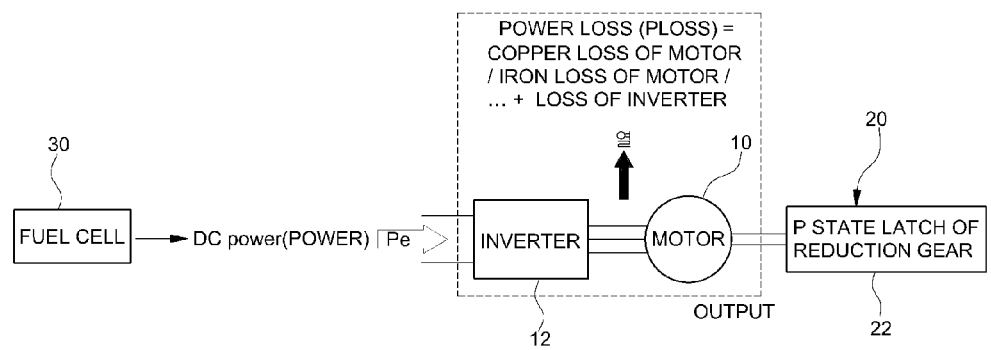
FIG. 2 is an exemplary configuration diagram illustrating a device for controlling cold start of a fuel cell system according to an exemplary embodiment of the present invention.

In other words, the exemplary embodiment of the present invention may be characterized in that a driving motor for the fuel cell system during the cold start condition may be used as a fuel cell load and the driving motor may consume a substantial amount of output current generated from the fuel cell stack to reduce the cold start time due to the increase in temperature of the fuel cell based on the self-heating of the fuel cell stack. Accordingly, as illustrated in FIG. 2, a device for controlling a cold start of a fuel cell system may include a fuel cell 30 configured to apply a current to a motor 10 during the cold start condition of the fuel cell system and a torque restriction part 20 configured to restrict a torque generated when a rotor of the motor 10 rotates forward and reversely based on an application of current.

Therefore, an output current of the fuel cell 30, that is, direct current (DC) power may be applied to the motor 10 by an operate of the inverter 12 during the cold start condition of the fuel cell, and as described below, when the rotor of the motor is motored (e.g., is operated), the consumption of the output current of the fuel cell may be increased due to consumed power. When the temperature of the fuel cell stack is increased based on the consumption of the output current of the fuel cell, the cold start condition of the fuel cell may be released, and simultaneously, the cold start time may be reduced.

Meanwhile, the torque restriction part 20 may be configured to interrupt the actual driving due to the motoring prior to the ending of the cold start by the torque generated while the rotor of the motor 10 rotates. The torque restriction part 20 may be a P stage latch 22 of a reduction gear restrictively fastened with an output shaft that extends from the rotor of the motor 10 to a driving wheel and may be a hydraulic brake apparatus configured to brake the driving wheel connected to the rotor of the motor 10. The torque restriction part 20 may also be operated by a controller.

For reference, the fuel cell system may be driven by driving the motor based on the output current generated from the fuel cell stack, outputting power to the reduction gear based on the driving of the motor, performing appropriate shifting in the reduction gear, and applying the shifted power to the driving wheel. Therefore, when the output shaft of the motor is locked to prevent rotation (e.g., is fixed) using the P stage latch 22 of the reduction gear, the torque based on the driving of the motor may be restricted to a range in which the actual driving is not performed.

A method for controlling a cold start according to an exemplary embodiment of the present invention based on the configuration will be described below. First, a principle of storing and recovering kinetic energy based on an angle rotation of the rotor of the motor will be described with reference to FIGS. 3 and 4.

Figure 3:
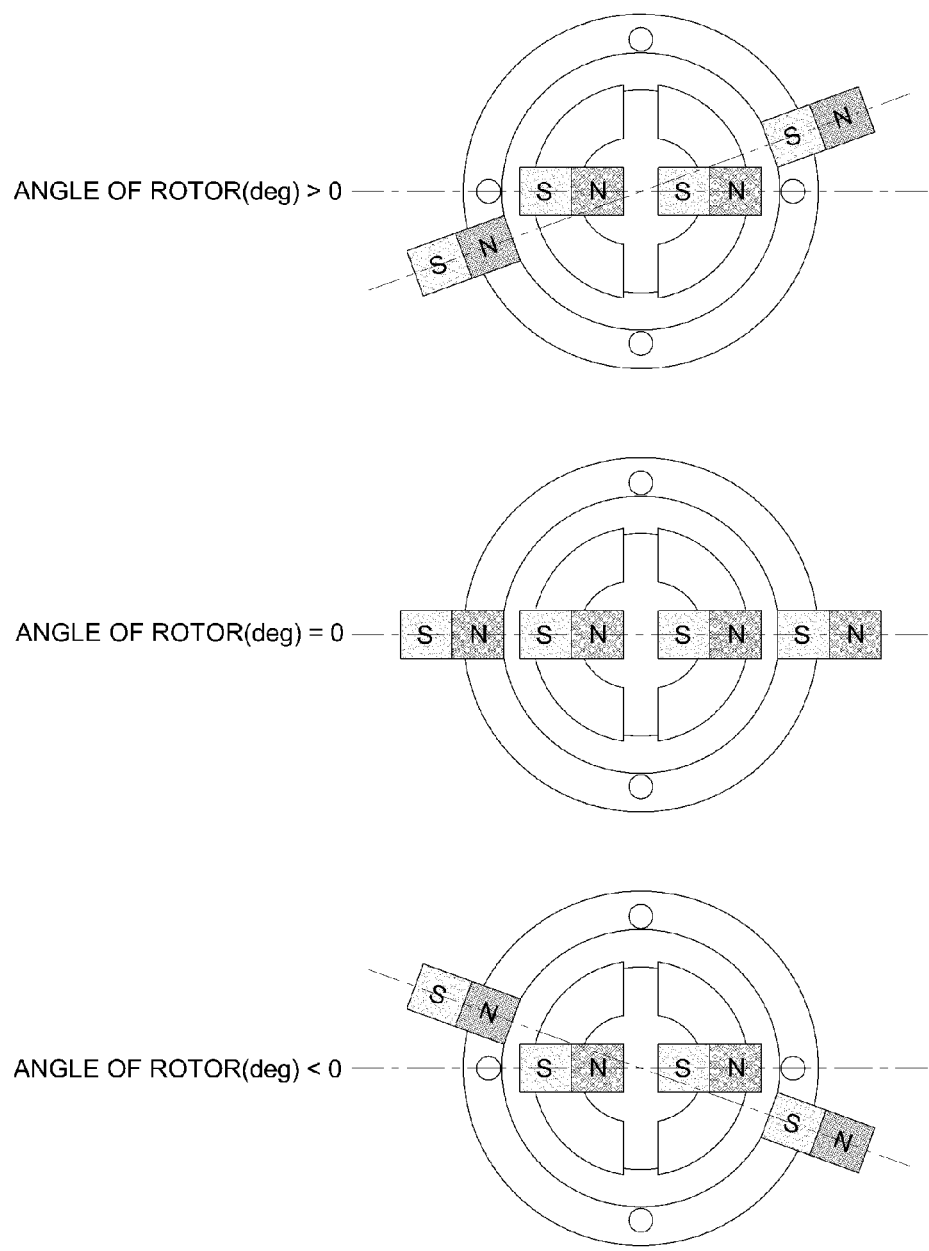
FIGS. 3 and 4 are exemplary schematic diagrams illustrating an angle rotation motion of a rotor of a motor and a generation of torque based on the angle rotation motion for describing a principle of controlling cold start of a fuel cell system according to an exemplary embodiment of the present invention.
Figure 4:
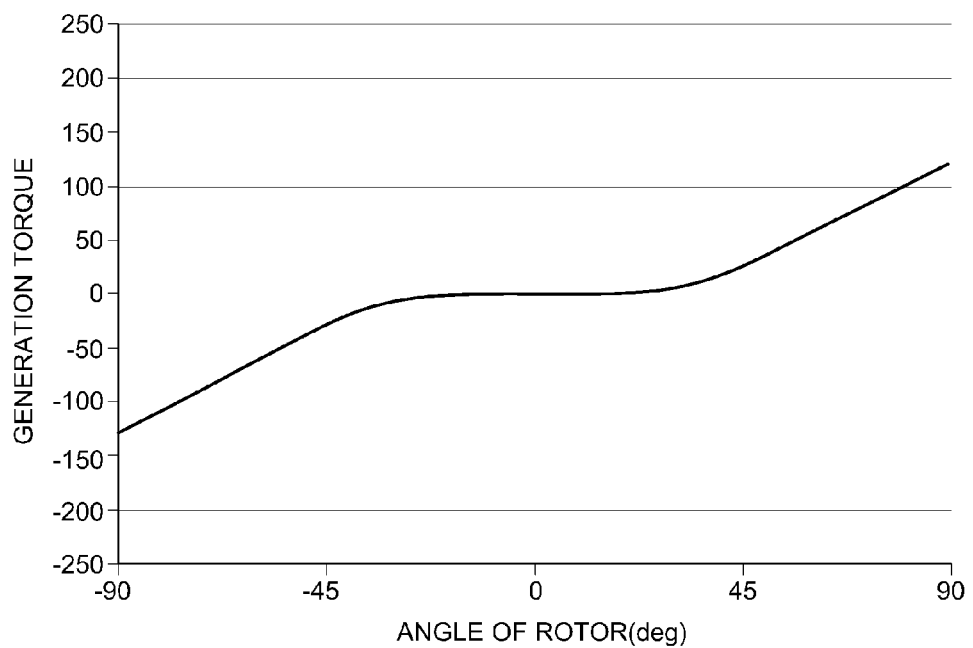
Figure 5:
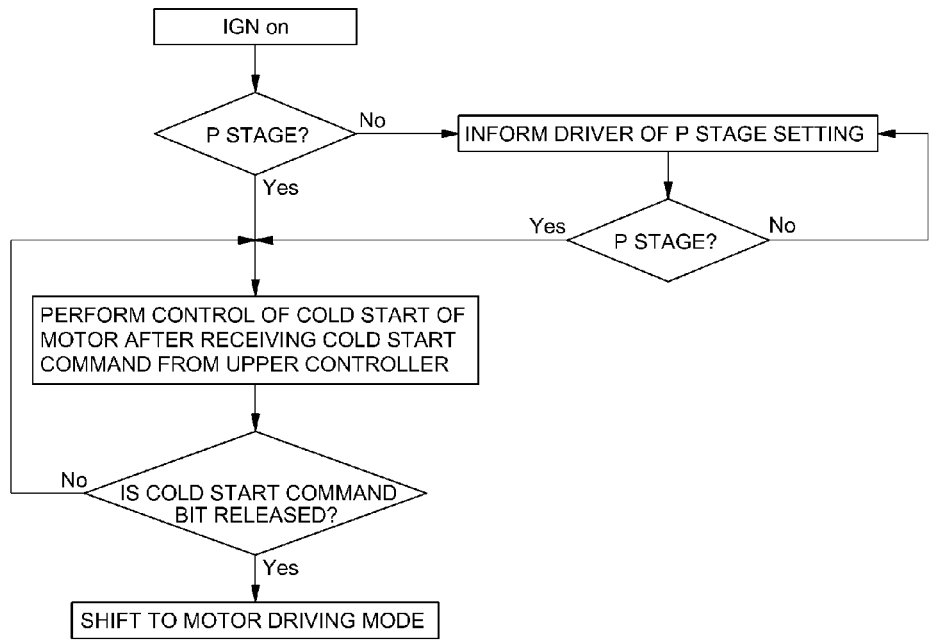
FIG. 5 is an exemplary flow chart illustrating a method for controlling a cold start of a fuel cell system according to an exemplary embodiment of the present invention.

When a magnitude of the output current of the fuel cell, that is, a phase current is applied to the motor while maintained substantially constant, as illustrated in FIG. 3, the rotor 12 of the motor 10 may be configured to vibrate while rotating within a predetermined angle range (e.g., +20° to −20° or +40° to −40°) to generate the torque as illustrated in FIG. 4. When a forward and reverse rotation angle of the rotor ranges from about +20° to −20°, the generation torque may be about zero (0), when the generation torque is equal to or greater than +20°, a positive torque may be increased, and when the generation torque is equal to or less than −20°, a negative torque may be generated. An angle range of the rotor from which the torque is output may be changed based on a motor design and a magnitude of a phase current.

By the torque generation principle of the rotor, when the rotor vibrates within, for example, a range of about +40° to −40°, the torque is generated, to cause the rotor angularly to rotate repeatedly in a forward (+) direction and a reverse (−) direction. In particular, the rotor of the motor may be configured to consume the output current of the fuel cell and output power as represented by the following Equation 1.

$$\text{Power} = \text{torque} \times \text{rotation speed} \qquad \text{Equation 1}$$

Figure 6:
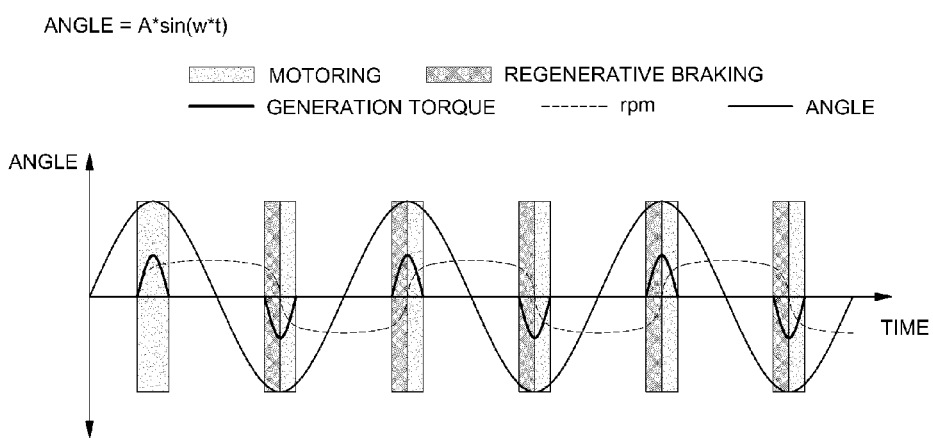
FIG. 6 is an exemplary graph illustrating a process of consuming and recovering power based on a motion of a rotor, during the control of the cold start of the fuel cell system according to the exemplary embodiment of the present invention.

Therefore, as illustrated in FIG. 6, during the operation (e.g., motoring) of the motor, power consumption which is a value obtained by multiplying a forward (+) rotation speed of the rotor by a positive (+) torque generated when the rotor rotates forward (+) may be generated and power consumption which is a value obtained by multiplying a reverse (−) rotation speed of the rotor by a negative (−) torque generated when the rotor rotates reverse (−) may be generated.

Furthermore, when the negative (−) torque is generated during the forward (+) rotation of the rotor or the forward (+) torque is generated during the reverse (−) rotation of the rotor, the power based on the regenerative braking may be recovered. In particular, when a current is applied from the inverter to the motor, power loss defined as a sum of a loss based on a copper loss and an iron loss of the motor, a loss of an inverter, and the like, may be present and therefore a substantial amount of energy may be consumed during the power consumption and a reduced amount of energy may be recovered during the recovery of power, allowing the motor to be used as a greater fuel cell load during the motoring of the motor than during the regenerative braking.

Therefore, it may be possible to increase the output current amount of the fuel cell based on the consumption of kinetic energy of the rotor by allowing the rotor to be the fuel cell load and reduce the cold start time by performing the self-heating of the fuel cell stack based on the output current amount of the fuel cell, by applying a current to the motor for driving the fuel cell system during the cold start condition to generate the angle rotation and the torque of the rotor.

In particular, the method for controlling a cold start according to the exemplary embodiment of the present invention will be described based on the principle of storing and recovering kinetic energy based on the angle rotation of the rotor of the motor as described above will be described below. First, the driver may operate the torque restriction part 20 in advance to interrupt the actual driving due to the motoring prior to the ending of the cold start by the torque generated while the rotor of the motor 10 rotates.

For example, the driver may perform the P stage shifting to make the P stage latch of the reduction gear be restrictively fastened with the output shaft that extends from the rotor to the driving wheel, to restrict the angle rotation of the rotor to an angle within the motoring for driving. Alternatively, the driver may operate the hydraulic braking apparatus of the driving wheel to restrict the rotor of the motor connected to the driving wheel, and thus the angle rotation of the rotor may be restricted to the angle within the motoring for driving.

Further, the output current of the fuel cell may be applied to the motor by a cold start command of an upper controller and the angle rotation may be repeatedly performed forward and reversely within the predetermine angle range (e.g., within a range from about +40° to −40°) of the motor based on the application of current. Accordingly, as the rotor of the motor angularly rotates repeatedly, the output current consumption of the fuel cell may be continuously increased. In other words, when a current is applied from the inverter to the motor as described above, the power loss defined as a sum of the loss based on the copper loss and the iron loss of the motor, the loss of an inverter, and the like may be present, and therefore a greater amount of energy may be consumed during the power consumption based on the angle rotation of the motor rotator and a smaller amount of energy may be recovered during the recovery of power, causing the output current consumption of the fuel cell to increase during motoring based on the angle rotation of the rotor of the motor.

In other words, as described above, when the output current consumption of the fuel cell is increased, during the motoring of the motor, the power consumption which is the value obtained by multiplying the forward (+) rotation speed of the rotor by the positive (+) torque generated when the rotor rotates forward (+) may be generated and power consumption which is the value obtained by multiplying the reverse (−) rotation speed of the rotor by the negative (−) torque generated when the rotor rotates reverse (−) may be generated.

Figure 7:
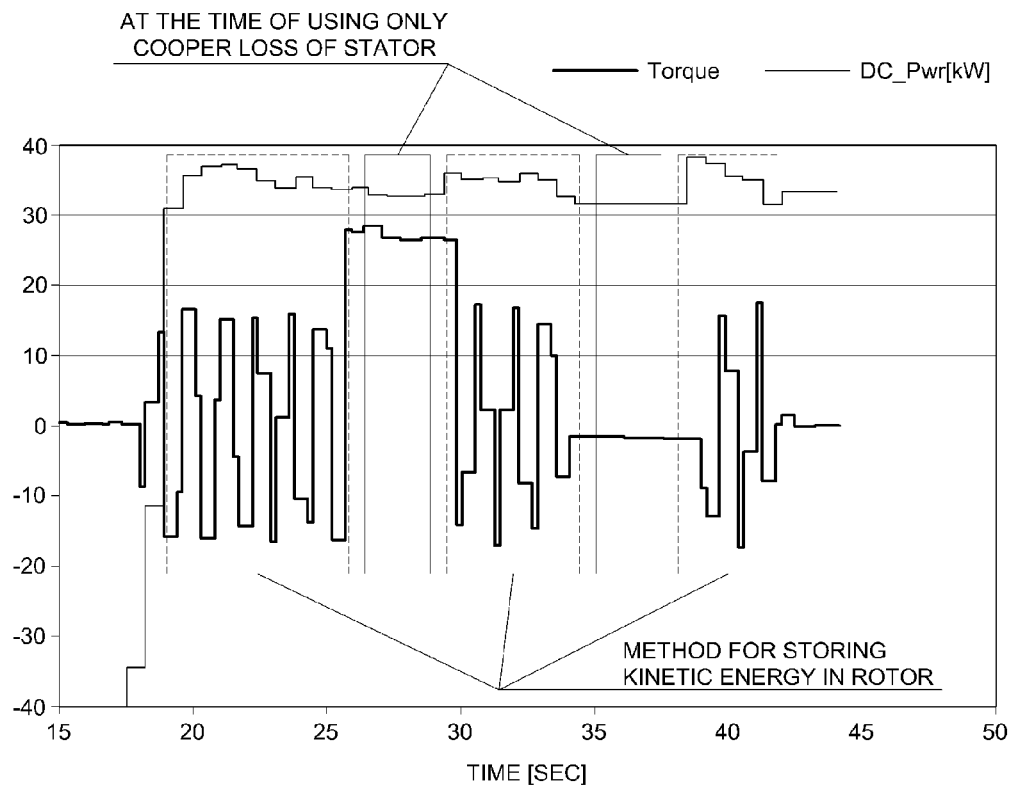
FIG. 7 is an exemplary graph illustrating a rotor torque of a motor and consumed DC power, during the control of the cold start of the fuel cell system according to the exemplary embodiment of the present invention.

As illustrated in FIG. 7, when the control of the cold start according to the exemplary embodiment of the present invention is performed based on the principle of storing and recovering kinetic energy of the rotor, it may be appreciated that the DC power consumption supplied from the fuel cell may be further increased than when the copper loss of the stator is used. In particular, when the cold start ends along with the release of the cold start condition, the upper controller may be configured to release the control of the cold start and operate the motor to be shifted to the driving mode for the original driving.

Figure 8:
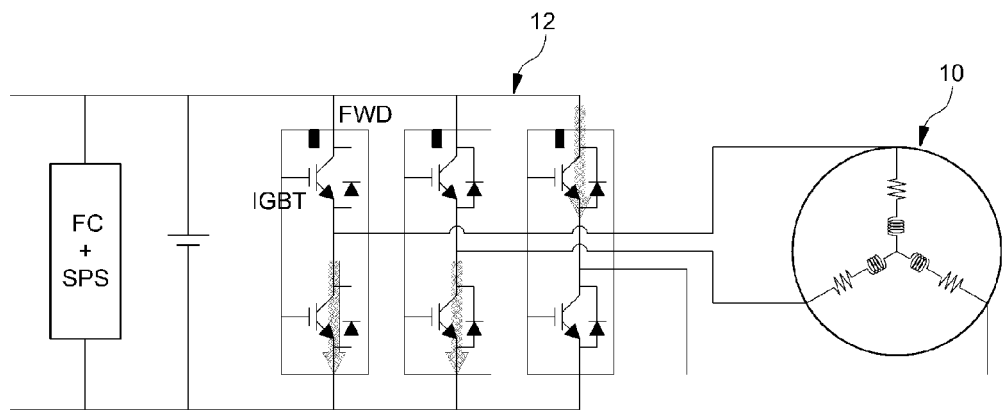
FIG. 8 is an exemplary circuit diagram of an inverter illustrating when some of the plurality of IGBTs of the inverter are used, based on the control of the cold start of the existing fuel cell system according to the related art.

As described above, the output current amount of the fuel cell based on the consumption of the kinetic energy of the motor rotor may be increased and the self-heating of the fuel cell stack may be performed based on the increase in the output current amount of the fuel cell to substantially reduce the cold start time. Meanwhile, when using the phase resistance heating of the motor among the existing cold start methods, since only a constant current is applied from the inverter to the motor to operate the rotor to the angle in which the rotor does not generate the torque, as illustrated in FIG. 8, some of the plurality of IGBTs of the inverter which is a type of controller applying a current to the motor is used, such that the lifespan and durability of the inverter may be degraded.

Figure 9:
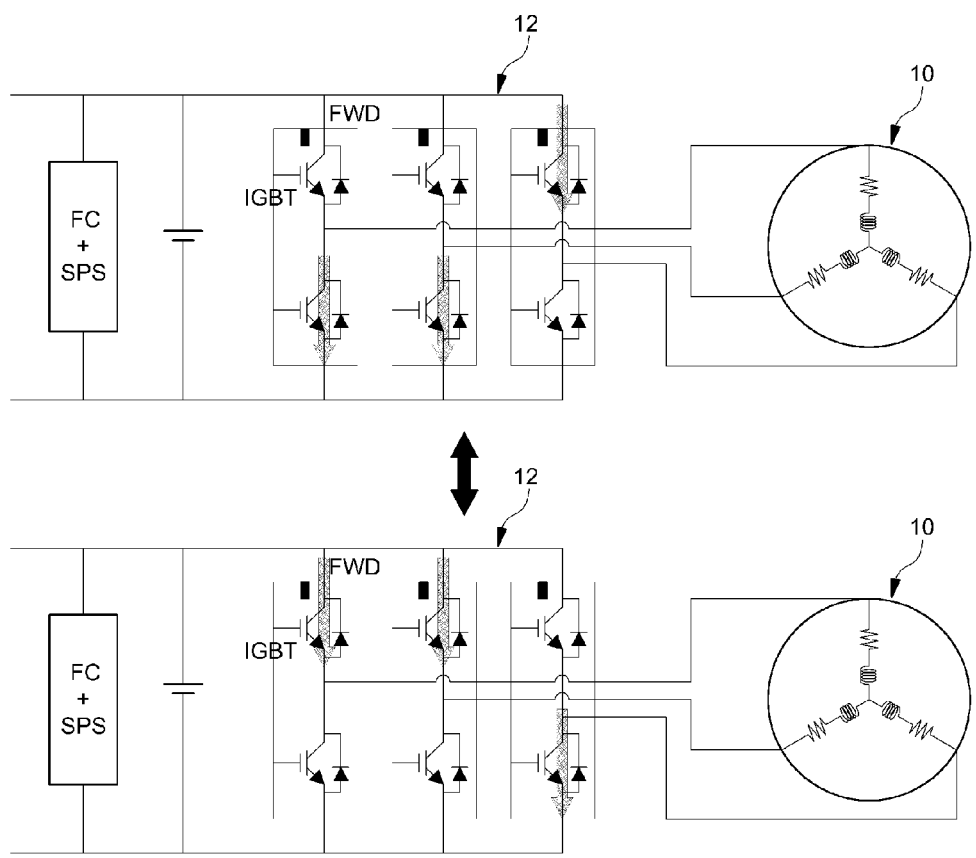
FIG. 9 is an exemplary circuit diagram of the inverter illustrating when the plurality of IGBTs of the inverter may be used, based on the control of the cold start of the fuel cell system according to the exemplary embodiment of the present invention.

Moreover, according to the exemplary embodiment of the present invention, since the rotor of the motor may be rotated forward and reversely at a predetermined angle to generate a torque, as illustrated in FIG. 9, the plurality of IGBTs of the inverter including the IGBT used during the forward rotation, the IGBT used during the reverse rotation, and the like may be uniformly used, and thus the degradation in the durability of the inverter may be prevented.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A device for controlling a cold start of a fuel cell system, comprising:
 a fuel cell configured to output a current during a cold start condition of the fuel cell system;
 an inverter electrically connected to the fuel cell to apply the output current of the fuel cell to the motor during the cold start condition of the fuel cell system;
 a rotor of the motor to be rotated forward and reversely at a predetermined angle to generate a torque;
 a torque restriction part configured to restrict a torque generated when a rotor of the motor rotates forward and reversely based on an application of current; and
 a controller to perform a cold start command such that the output current of the fuel cell is applied to the motor and the rotor of the motor is repeatedly rotated forward and reversely within the predetermined angle range of the motor based on the application of current,
 wherein output current consumption of the fuel cell is increased due to power consumed in the motor during the cold start condition.

2. The device of claim 1, wherein the torque restriction part is a park (P) stage latch of a reduction gear restrictively fastened with an output shaft that extends from the rotor of the motor to a driving wheel.

3. The device of claim 1, wherein the torque restriction part is a hydraulic brake apparatus of a driving wheel.

4. The device of claim 1, wherein in the increasing of the output current consumption of the fuel cell, during operation of the motor, power consumption which is a value obtained by multiplying a forward (+) rotation speed of the rotor by a positive (+) torque generated when the rotor rotates forward (+) is generated and power consumption which is a value obtained by multiplying a reverse (−) rotation speed of the rotor by a negative (−) torque generated when the rotor rotates reverse (−) is generated.

5. The device of claim 1, wherein in the restricting of the torque, shifting to a P stage is performed to restrictively fasten a P stage latch of a reduction gear with an output shaft from the rotor to a driving wheel.

6. The device of claim 1, wherein in the restricting of the torque, a hydraulic brake apparatus of a driving wheel is operated to restrict the driving wheel connected to the rotor via an output shaft.

7. The device of claim 1, wherein the output current of the fuel cell is applied to the motor by a cold start command of an upper controller and the angle rotation is repeatedly performed forward and reversely within the predetermine angle range of the motor based on the application of current.

* * * * *